_3,000,834_
METHOD OF PREPARING A GREEN ELECTRO-LUMINESCENT ZINC SULPHIDE PHOSPHOR
Manuel Aven, Lyndhurst, Ohio, assignor to General Electric Company, a corporation of New York
No Drawing. Filed Apr. 18, 1958, Ser. No. 729,227
6 Claims. (Cl. 252—301.6)

This invention relates to luminescent materials or phosphors and more particularly to an electroluminescent zinc sulphide phosphor responding with a green emission under electric field excitation.

Electroluminescent phosphors are used in electroluminescent lamps or cells, sometimes known as luminous capacitors, wherein a thin layer of phosphor which may be dispersed in a suitable dielectric medium is sandwiched between a pair of conducting plates at least one of which is transparent. When an alternating voltage is applied across the plates, the phosphor emits visible light which escapes through the transparent plate.

One of the most vexing problems in the commercial application of electroluminescent lamps is the rapid deterioration or loss of brightness of the cells under conditions of high humidity. In some forms of electroluminescent lamps wherein the phosphor is embedded in a glass dielectric which is sprayed onto a metal plate, the problem of water depreciation is not so acute. However such lamps are not nearly as bright as lamps wherein the phosphor is dispersed in a high dielectric constant organic plastic medium. This latter kind of electroluminescent lamps is readily adaptable to plastic encapsulation and, in addition to higher brightness, has the advantages of lightness and flexibility. An example of such an electroluminescent lamp is described and claimed in copending application Serial No. 701,906 of Elmer G. Fridrich and Paul A. Dell, filed December 10, 1957, entitled "Electroluminescent Lamp and Manufacture Thereof" and assigned to the same assignee as the present invention, now Patent 2,945,976. That lamp comprises a flexible laminated assembly of electrically active layers encased in a thin envelope of thermoplastic material such as polyethylene which is evacuated and completely heat-sealed all around the edges. The electrically active elements comprise an aluminum foil coated with a layer of high dielectric constant material which in turn is overcoated with a layer of electroluminescent phosphor and finally overlaid with a sheet of conducting glass paper. The aluminum foil and the conducting glass paper form the electrodes of the lamp to which an alternating potential is applied and light is emitted through the glass paper and plastic envelope.

Transparent or light transmitting plastic films commercially available at the present time are not completely impervious to moisture. For instance one form of plastic-faced electroluminescent lamp encapsulated in a polyethylene envelope and utilizing a known green electroluminescent zinc sulphide phosphor has been found to depreciate to 18% of its initial brightness after 96 hours of operation in a 100% humidity box.

The object of this invention is to provide an electroluminescent green emitting zinc sulphide phosphor having an improved resistance to water depreciation, and a method of preparing such a phosphor. I have determined that one of the factors which retards the rate of water depreciation of a phosphor is a small surface to volume ratio in the phosphor particles. The electroluminescent phosphors which have been made to date have generally been of relatively small particle size, for instance under 10 microns and with the maximum distribution occurring in the range of 5–8 microns. It has proven extremely difficult to create larger particles in a green emitting electroluminescent phosphor; in many attempts, the final result has been either a failure to increase the particle size, or where the particle size was increased, it entailed a loss of brightness or a shift in color toward blue.

In accordance with the invention, a green emitting electroluminescent zinc sulphide phosphor is prepared by prefiring a mixture of precipitated pure zinc sulphide and zinc oxide at a temperature above the hexagonal-cubic transition point in the range of 1150 to 1250° C., preferably at 1200° C. The duration of the prefiring time is not critical and one hour is sufficient. The proportion of zinc oxide in the total mixture may be in the range of 10 to 40% and I prefer to use approximately 25%, that is a ZnS/ZnO ratio of 3:1 by weight. The material is then cooled to room temperature and copper and chlorine added as activator and coactivator. The copper may be added in the form of a copper salt such as copper sulphate, $CuSO_4$, to give from 0.1 to 0.75 mole percent copper, preferably about 0.5 mole percent copper in the prefired material. Chlorine may be added in the form of an ammonium chloride $NH_4Cl$ or zinc chloride $ZnCl_2$ solution, to give between 1 and 3 mole percent, preferably approximately 2 mole percent, chlorine in the prefired material. After drying the prefired material is refired at a temperature below the hexagonal-cubic transition point and in the range of 850 to 950° C., preferably at approximately 900° C. The refiring is done by placing the mixture in the inner one of a pair of close-fitting silica tubes, the inner one being inserted open-end foremost within the outer. This allows any gases to be expelled and prevents air from diffusing back and causing excessive oxidation of the zinc sulphide. The duration of the firing time is not critical provided it be long enough to allow substantial transformation from hexagonal to cubic form; a period of approximately 18 hours is adequate.

Some additional zinc oxide may be added to the prefired material previous to the refiring with results to be pointed out hereafter.

After cooling, the refired material is dark in color and may be washed in dilute acid and then in dilute cyanide solution, for instance acetic acid and potassium cyanide to remove free zinc oxide and superficial copper compounds respectively. The refired material then has a pale buff-gray body color and consists of relatively coarse crystals with the texture of fine sand, the particle size being in the range of 30 microns and some of the crystals being as large as 100 microns. The phosphor particles exhibit a green electroluminescence generally superior in brightness to standard green electroluminescent phosphors prepared by conventional methods and having a much improved resistance to water depreciation.

The improved phosphors made in accordance with the invention may be compared with a standard green electroluminescent phosphor consisting of 75% ZnS and 25% ZnO activated with copper and coactivated with chlorine and prepared by firing at 900° C. in covered crucibles in air. In order to test the various phosphors for brightness and resistance to water depreciation, electroluminescent lamps or cells were made similar to those described in the aforementioned Fridrich and Dell application but wherein the luminescent layer consisted of the phosphor dispersed in polystyrene having a dielectric constant of approximately 3. Casting of the phosphor in polystyrene is easier than using other organic dielectrics having higher dielectric constants and gives results adequate for the purpose of comparing relative phosphor performance. The cell comprised an aluminum foil coated with an insulating layer of barium titanate dispersed in cyanoethyl cellulose which in turn is overcoated with the layer of electroluminescent phosphor in polystyrene and overlaid with a sheet of conducting glass paper. These layers are encased in a thin envelope of polyethylene sheets evacuated and completely heat sealed around its edges. Brightness tests were performed by energizing the cell with 115 volt, 60 cycle alternating voltage. Resistance to water depreciation was determined by operating the cells in a 100% humidity box for 96 hours and determining the final brightness as a percentage of initial brightness. The ratio of the percentage brightness of the test phosphor after 96 hours' operation in 100% humidity to that of the standard electroluminescent green phosphor under similar conditions then is a figure of merit indicative of the resistance to water depreciation of the test phosphor. The electroluminescent lamps using the standard green phosphor showed an initial brightness of 1.1 foot-lamberts. They depreciated to approximately 18% of the initial brightness after 96 hours' operation in 100% humidity, such depreciation corresponding to a figure of merit of 1. By comparison, electroluminescent lamps using the improved green electroluminescent phosphor in accordance with the invention showed brightness ranging from 1.2 to 2.5 foot-lamberts and a figure of merit ranging from 6 to 10.

Two specific examples of suitable phosphor preparations in accordance with the invention are as follows:

*Example 1.*—Precipitated ZnS and ZnO in a weight ratio of 3:1 is prefired for one hour at 1200° C. in a silica tube closed at one end and having the other end partially sealed by a plug allowing escape of volatile components. The prefired material is cooled and copper sulphate solution added to give 0.5 mole percentage copper, and zinc chloride to give 2 mole percentage chlorine to the prefired material. After drying the mixture is fired at 900° C. for 18 hours in a silica tube, partially closed as previously described to prevent ingress of air. The fired material is then washed in dilute acid followed by a wash in a dilute potassium cyanide solution to remove free ZnO and superficial Cu compounds respectively. The resulting material has a pale buff-gray body color and is decidedly crystalline with an average particle size of approximately 30 microns and going as high as 100 microns. A test electroluminescent lamp made with this phosphor showed an initial brightness of 1.6 foot-lamberts at a figure of merit of 10 and exhibited a bright green color.

*Example 2.*—In the prefiring, the same procedure and materials are used as given under Example 1. The materials are ZnO and ZnS in a weight ratio of approximately 3:1; the activation schedule, namely the addition of copper sulphide and ammonium chloride, is the same. However an additional lot of ZnO is added to the dried mixture before refiring, the added quantity of ZnO being approximately 25% by weight of the total. The refiring procedure and subsequent treatment thereafter are the same as given under Example 1. Sample electroluminescent lamps made with the resulting phosphor showed a bright green electroluminescent response having an initial brightness of 2.3 foot-lamberts and a figure of merit of 6.

The addition of a second lot of ZnO after prefiring in Example 2 causes an increase in the initial brightness but at the expense of an approximately proportional decrease in the figure of merit. The product of the initial brightness by the figure of merit is 24 for the first example and 23 for the second; in other words it remains approximately the same. The quantity of additional ZnO added prior to refiring may be 10 to 40% of the total weight: the proportion is not critical and 25% is preferred.

To obtain the improved results in a green electroluminescent phosphor in accordance with the invention, it is important that a substantial proportion of ZnO be present with the ZnS in the prefiring and that the prefiring be done at a temperature in the range of 1150 to 1250° C., preferably at 1200° C. In the absence of ZnO in the prefiring, when the prefiring temperature is in the stated range e.g. 1200° C., the electroluminescent response shifts towards the blue. This might be avoided by dropping the prefiring temperature to 1100° C., but then the figure of merit or the brightness drops to low values by comparison. Even with a substantial proportion of ZnO present, when the prefiring is done at 1100° C. either the initial brightness is low or the figure of merit is low.

Provided a substantial proportion of ZnO is present at least at prefiring, the improved green electroluminescent response in accordance with the invention will be obtained. If maximum figure of merit is desired, the procedure of Example 1 wherein no additional ZnO is provided at refiring is followed. If maximum initial brightness is desired, the procedure of Example 2 where additional ZnO is provided at refiring is followed.

The specific examples of embodiments of the invention given herein are intended as illustrative and not as limitative of the invention whose scope is to be determined by the appended claims.

What I claim as new and desire to secure by Letters Patent of the United States is:

1. The method of preparing a green electroluminescent phosphor having a large particle size for improved resistance to water depreciation which comprises prefiring at a temperature in the range of 1150 to 1250° C. a mixture of ZnS and 10 to 40% ZnO by weight, cooling the prefired material and adding copper and chloride salts to provide 0.1 to 0.75 mole percent and 1 to 3 mole percent respectively, and refiring at a temperature in the range of 850–950° C. for a length of time sufficient to assure substantial transformation from the hexagonal to the cubic phase in the refired material.

2. The method of preparing a green electroluminescent phosphor having a large particle size for improved resistance to water depreciation which comprises prefiring at a temperature in the range of 1150 to 1250° C. a mixture of ZnS and approximately 25% ZnO by weight, cooling the prefired material and adding copper and chloride salts to provide 0.1 to 0.75 mole percent and 1 to 3 mole percent respectively, and refiring at a temperature in the range of 850–950° C. for a length of time sufficient to assure substantial transformation from the hexagonal to the cubic phase in the refired material.

3. The method of preparing a green electroluminescent zinc sulphide phosphor having an improved resistance to water depreciation which comprises prefiring a mixture of ZnS and 10 to 40% ZnO by weight at a temperature of approximately 1200° C. for a period of approximately 1 hour, cooling the fired material, adding thereto copper and chloride salts to provide mole percentages of approximately 0.5% copper and 2% chlorine, refiring the material at a temperature of approximately 900° C. for at least approximately 15 hours, cooling and washing the phosphor in a dilute acid and a dilute cyanide solution.

4. The method of preparing a green electroluminescent zinc sulphide phosphor having an improved resistance to water depreciation which comprises prefiring a mixture of ZnS and approximately 25% ZnO by weight at a temperature of approximately 1200° C. for a period of approximately 1 hour, cooling the fired material, adding thereto copper sulphate and zinc chloride to provide mole percentages of approximately 0.5% copper and 2% chlorine, refiring the material at a temperature of approximately 900° C. for at least approximately 15 hours, cooling and washing the phosphor in a dilute acid and a dilute cyanide solution.

5. The method of preparing a green electroluminescent zinc sulphide phosphor having a large particle size for improved resistance to water depreciation which comprises prefiring a mixture of ZnS and 10 to 40% ZnO at a temperature in the range of 1150 to 1250° C., cooling the prefired material, adding copper and chloride salts to provide 0.1 to 0.75 mole percent and 1 to 3 mole percent respectively, adding more ZnO in a percentage of 10 to 40% by weight of the total, and refiring at a temperature in the range of 850 to 950° C. for a length of time sufficient to assure substantial transformation from the hexagonal to the cubic phase in the refired material.

6. The method of preparing a green electroluminescent zinc sulphide phosphor having a large particle size for improved resistance to water depreciation which comprises prefiring a mixture of ZnS and approximately 25% ZnO by weight at a temperature of approximately 1200° C. for a time of approximately 1 hour, cooling the prefired material, adding copper sulphate and zinc chloride to provide mole percentages of approximately 0.5% copper and 2% chlorine respectively, adding more ZnO to a percentage of approximately 25% of the total to provide maximum initial brightness simultaneously with high resistance to water depreciation, and refiring at a temperature of approximately 900° C. for at least approximately 15 hours in order to assure substantial transformation from the hexagonal to the cubic phase in the refired material.

References Cited in the file of this patent

UNITED STATES PATENTS 2,821,509     Hunt et al. _____ Jan. 28, 1958

FOREIGN PATENTS 526,180     Belgium _____ Aug. 2, 1954